US009590952B2

(12) United States Patent
Wu et al.

(10) Patent No.: US 9,590,952 B2
(45) Date of Patent: Mar. 7, 2017

(54) LOSSY DATA STREAM DECODER

(71) Applicant: Microsoft Technology Licensing, LLC, Redmond, WA (US)

(72) Inventors: Yongjun Wu, Bellevue, WA (US); Fedir Yuriyovych Kyslov, Redmond, WA (US); Shyam Sadhwani, Bellevue, WA (US); Samuel John Wenker, Kirkland, WA (US); Brian P. Evans, Allen, TX (US); Hany Farag, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 4 days.

(21) Appl. No.: 14/478,488

(22) Filed: Sep. 5, 2014

(65) Prior Publication Data
US 2016/0072773 A1     Mar. 10, 2016

(51) Int. Cl.
*H04L 29/06* (2006.01)
*H04N 21/4405* (2011.01)

(52) U.S. Cl.
CPC .......... *H04L 63/0428* (2013.01); *H04L 69/22* (2013.01); *H04N 21/44055* (2013.01)

(58) Field of Classification Search
CPC ... H04L 1/0057; H04L 1/0061; H04L 1/0064; H04L 1/0071; H04L 1/0083; H04L 1/0618; H04L 27/2627; H04L 27/2666; H04L 5/22; H04L 63/0428; H04L 69/22; H04N 19/127; H04N 19/159;
(Continued)

(56) References Cited

U.S. PATENT DOCUMENTS 8,027,469 B2   9/2011  Candelore et al.
8,625,788 B2   1/2014  Pendakur et al.
(Continued)

FOREIGN PATENT DOCUMENTS

KR   20130118798   10/2013

OTHER PUBLICATIONS

Arachchi, et al., "Adaptation-Aware Encryption of Scalable H.264/AVC Video for Content Security", In Proceedings of Signal Processing: Image Communication, vol. 24, No. 6, Jul. 2009, 23.
(Continued)

*Primary Examiner* — Morshed Mehedi
*Assistant Examiner* — Abiy Getachew
(74) *Attorney, Agent, or Firm* — Sunah Lee; Dan Choi; Micky Minhas

(57) ABSTRACT

Lossy data stream decoder techniques are described herein. In response to a request for decoded content from a consuming application, a decoder may validate headers and identify portions of the data that are considered pertinent to the request. The decoder then performs lossy extraction to form incomplete data that is provided to the consuming application in response to the request. The full data for the data stream is not exposed to the consuming application or other downstream components. In this way, the consuming application is provided data sufficient to perform requested graphics processing and resource management operations, while at the same time the risk of piracy is mitigated since the consuming application is unable to get a full version of the data in the clear and the data have been validated by the decoder.

20 Claims, 5 Drawing Sheets

(58) Field of Classification Search
CPC ...... H04N 19/172; H04N 19/42; H04N 19/44; H04N 19/51; H04N 19/61
USPC .......................................................... 713/160
See application file for complete search history.

(56) References Cited

U.S. PATENT DOCUMENTS

| | | | |
|---|---|---|---|
| 2004/0139335 A1* | 7/2004 | Diamand | H04N 5/913 713/189 |
| 2006/0227250 A1* | 10/2006 | Barbieri | G11B 27/28 348/700 |
| 2009/0080533 A1* | 3/2009 | Folta | H04N 19/159 375/240.25 |
| 2009/0323820 A1 | 12/2009 | Wu et al. | |
| 2011/0299680 A1 | 12/2011 | Vembu et al. | |
| 2012/0121025 A1 | 5/2012 | Bonaparte et al. | |
| 2012/0287999 A1 | 11/2012 | Li et al. | |
| 2013/0142257 A1 | 6/2013 | Wang et al. | |
| 2013/0208814 A1* | 8/2013 | Argyropoulos | H04N 17/004 375/240.27 |
| 2014/0086326 A1 | 3/2014 | Dziecielewski | |
| 2014/0092991 A1 | 4/2014 | Sullivan et al. | |
| 2014/0168362 A1 | 6/2014 | Hannuksela et al. | |

OTHER PUBLICATIONS

Iqbal, et al., "Hard Authentication of H.264 Video Applying Mpeg-21 Generic Bitstream Syntax Description (Gbsd)", In Proceedings: IEEE International Conference on Multimedia and Expo, Jul. 2, 2007, 4 Pages.

"International Search Report and Written Opinion", Application No. PCT/US2015/048226, Oct. 28, 2015, 10 Pages.

\* cited by examiner

LOSSY DATA STREAM DECODER

BACKGROUND

The functionality that is available to users of computing devices is ever increasing. Once example of this increase is the ability to consume and output video by the device. To support transfer and storage of the video, the video is often compressed, which may be performed using a variety of different compression standards (e.g., codecs), such as H.264/AVC and HEVC/H.265. Secure decoding of encrypted data streams may be accomplished by a decoder that performs decryption on behalf of consuming application.

Generally, the decoder may provide the consuming application with at least some set-up information that enables the consuming application to set-up a processing pipeline for the data stream and direct operation of the decoder and/or graphics processing system to decode the data stream. The set-up information may include decoded portions of protected content in the clear. This produces a security risk that individuals and malicious applications may misuse the set-up information mechanism to collect decoded portions of the stream, reconstruct the data stream, and distribute pirated content. Consequently, use of conventional decoding techniques may have significant security implications.

SUMMARY

Lossy data stream decoder techniques are described herein. In one or more implementations, a data stream of encrypted content may be consumed at a computing device having a secure decoder designed to handle decoding of the content. In response to a request for decoded content from the operating system (OS) or other consuming application, the decoder may operate to parse headers corresponding to the request to validate the headers and determine types of data included in associated data packets. Portions of the data that are considered pertinent to the request are identified based on the parsing and the decoder performs lossy extraction to form incomplete data that is then provided in response to the request.

For instance, lossy extraction may extract and decode bits corresponding to pertinent portions without including other bits associated with non-pertinent portions. The decoder may include a parser that performs validation to match the request to a sub-set of data deemed sufficient to fulfill the request, configures a response to provide the sub-set of data, and withholds other data. In this way, the consuming application obtains data sufficient to perform particular operations, such a graphics processing set-up, and at the same time the risk of piracy is mitigated since the consuming application is unable to get a full version of the data in the clear.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Conventional decoding techniques may have significant security implications because graphics processing set-up, picture management, and resource management information provided to applications may include decoded portions of protected content in the clear. Individuals and malicious applications may misuse the set-up information to collect different decoded portions of the stream, reconstruct the full data stream, and distribute pirated content.

Lossy data stream decoder techniques are described herein. In one or more implementations, a data stream of encrypted content may be consumed at a computing device having a secure decoder designed to handle decoding of the content. In response to a request for decoded content from the operating system (OS) or other consuming application, the decoder may operate to parse headers corresponding to the request to validate the headers and determine types of data included in associated data packets. Portions of the data that are considered pertinent to the request are identified based on the parsing and the decoder performs lossy extraction to form incomplete data that is provided in response to the request.

For instance, lossy extraction may extract and decode bits corresponding to pertinent portions without including other bits associated with non-pertinent portions. The decoder performs validation to match the request to a sub-set of data deemed sufficient to fulfil the request, configures a response to provide the sub-set of data, and withholds other data. In this way, the consuming application obtains data sufficient to perform particular operations, such a graphics processing set-up, and at the same time the risk of piracy is mitigated since the consuming application is unable to get a full version of the data in the clear.

In the discussion that follows, a section titled "Operating Environment" is provided and describes one environment in which one or more implementations can be employed. Following this, a section titled "Lossy Data Stream Decoder Details" describes example details and procedures in accordance with one or more implementations. Last, a section titled "Example System" describes example computing systems, components, and devices that can be utilized to implement one or more implementations.

Operating Environment

Figure 1:
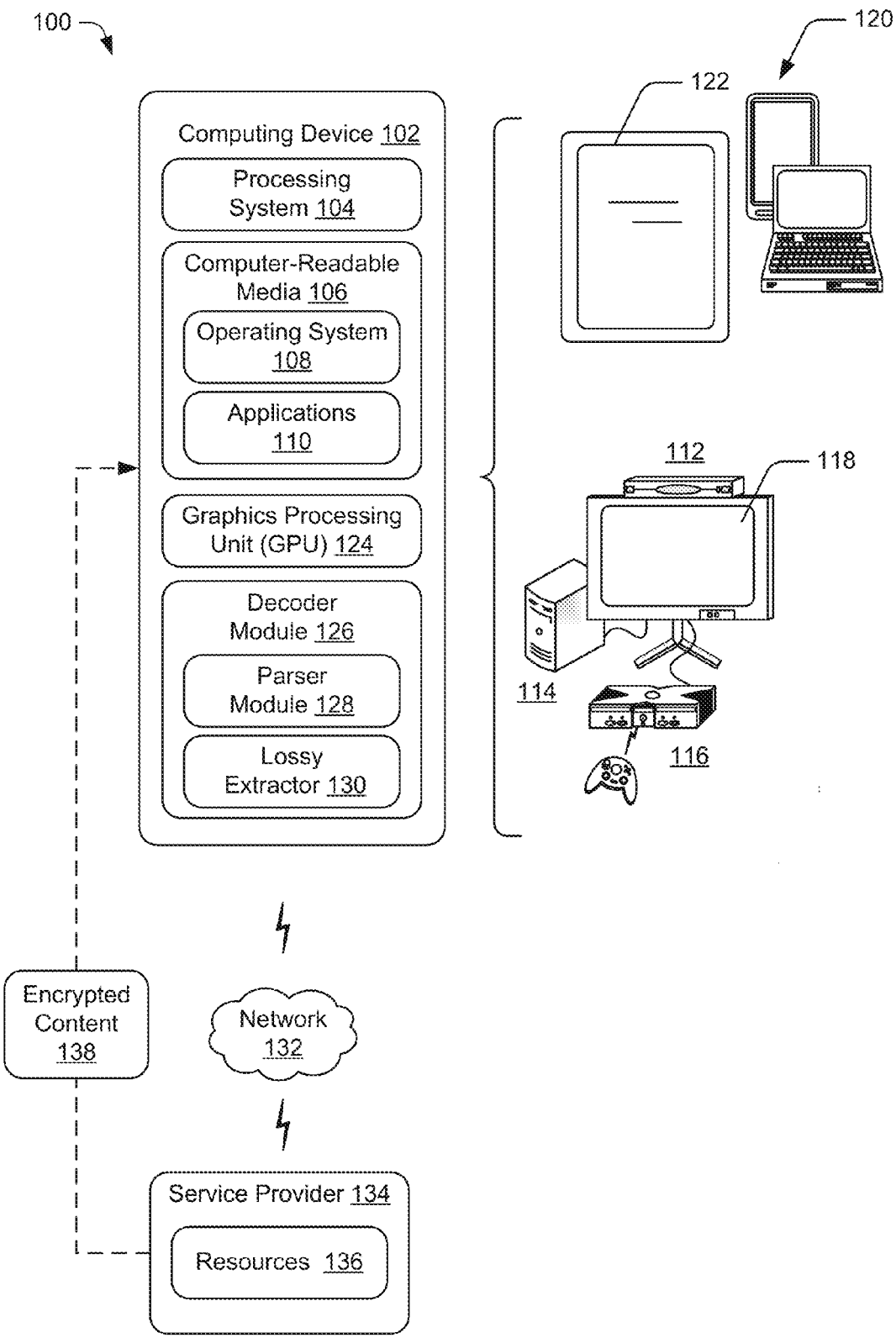
FIG. 1 illustrates an example operating environment in accordance with one or more implementations.

FIG. 1 illustrates an operating environment in accordance with one or more embodiments, generally at 100. The environment 100 includes a computing device 102 having a processing system 104 with one or more processors and devices (e.g., CPUs, GPUs, microcontrollers, hardware elements, fixed logic devices, etc.), one or more computer-readable media 106, an operating system 108, and one or more applications 110 that reside on the computer-readable media and which are executable by the processing system. The processing system 104 may retrieve and execute computer-program instructions from applications 110 to provide a wide range of functionality to the computing device 102, including but not limited to gaming, office productivity, email, media management, printing, networking, web-browsing, and so forth. A variety of data and program files related to the applications 110 can also be included, examples of which include games files, office documents, multimedia files, emails, data files, web pages, user profile and/or preference data, and so forth.

The computing device 102 can be embodied as any suitable computing system and/or device such as, by way of example and not limitation, a gaming system, a desktop computer, a portable computer, a tablet or slate computer, a handheld computer such as a personal digital assistant (PDA), a cell phone, a set-top box, a wearable device (e.g., watch, band, glasses, etc.) and the like. For example, as shown in FIG. 1 the computing device 102 can be implemented as a television client device 112, a computer 114, and/or a gaming system 116 that is connected to a display device 118 to display media content. Alternatively, the computing device may be any type of portable computer, mobile phone, or portable device 120 that includes an integrated display 122. Any of the computing devices can be implemented with various components, such as one or more processors and memory devices, as well as with any combination of differing components. One example of a computing system that can represent various systems and/or devices including the computing device 102 is shown and described below in relation to FIG. 5.

The computer-readable media can include, by way of example and not limitation, all forms of volatile and non-volatile memory and/or storage media that are typically associated with a computing device. Such media can include ROM, RAM, flash memory, hard disk, removable media and the like. Computer-readable media can include both "computer-readable storage media" and "communication media," examples of which can be found in the discussion of the example computing system of FIG. 5.

The computing device 102 may also include a graphics processing unit (GPU) 124 separate from the processing system that operates to perform various processing related to graphics output by the computing device for display on the display device 118 or integrated display 122. Alternatively, the GPU may be implemented as a component of the processing system along with other hardware, such as a CPU. The GPU 124 is a hardware component of the computing device that is dedicated to graphics processing. Functionality provided by the GPU 124 may include controlling aspects of resolution, pixel shading operations, color depth, texture mapping, 3D rendering, and other tasks associated with rendering user interfaces and images for applications. This can include processing tasks such as polygon drawing, bitmap transfers and painting, window resizing and repositioning, line drawing, font scaling, and so forth. The GPU 124 may be capable of handling these processing tasks in hardware at greater speeds than software that is executed via a CPU or other processing devices of the processing system 104. Thus, the dedicated graphics processing capability of the GPU 124 can accelerate graphics processing, reduce the workload of the processing system 104, and free up system resources for other tasks. The GPU 124 and other processing hardware (e.g., CPUs) may perform separate sequential processing of commands on different respective timelines for rendering of frames, graphics, and/or other processing tasks.

In order to handle processing tasks related to encrypted content, the GPU 124 may include or otherwise make use of a decoder module 126. The decoder module 126 may represent hardware, software, firmware, fixed device logic and combinations thereof configured to provide functionality to process, decode, supply and otherwise manage encrypted content on behalf of the operating system 108 and other applications 110 that consume the content (e.g., "consuming applications"). In the depicted example, the decoder module 126 is illustrated as a standalone software module or hardware component, however, the decoder module 126 may alternatively be provided as an integrated hardware component of the GPU, a software component of the OS or other application, via a decoding specific microprocessor, and so forth. In one or more implementations, the decoder module 126 is configured as a secure decoder designed to restrict access to content in the clear. To do so, the decoder module 126 may perform decoding of encrypted content on behalf of consuming applications without exposing the content outside of secure components and boundaries of the graphics processing system.

The decoder module 126 may be further configured to implement various operations and techniques for lossy data stream decoding as described in this document. In order to do so, the decoder module 126 may include or make use of a parser module 128 and a lossy extractor 130 as depicted in FIG. 1. The parser module 128 represents functionality associated with the decoder module 126 to perform operations for validation of data streams and matching of requests from consuming applications to data from the data stream deemed pertinent to the request. The parser module 128 may be configured to support a variety of self-validations and cross validations details and examples of which are discussed later in this document. The lossy extractor represents functionality associated with the decoder module 126 to perform lossy extraction based on parsing of the data stream to extract portions of data from the data stream that are pertinent, as detailed herein. The decoder module 126 may then form a response to the request for communication back to the consuming application that includes the pertinent data sufficient to fulfill the request, while withholding at least some other data. In this way, the complete data stream is not exposed to the consuming application in a manner that would enable reconstruction of encrypted content in the clear, thereby creating substantial barriers to piracy. Details regarding these and other aspects of a decoder module, validation of data streams, and lossy extraction are discussed in relation to the following figures.

The environment 100 further depicts that the computing device 102 may be communicatively coupled via a network 132 to a service provider 134, which enables the computing device 102 to access and interact with various resources 136 made available by the service provider 134. The resources 136 can include any suitable combination of content and/or services typically made available over a network by one or more service providers. For instance, content can include various combinations of text, video, ads, audio, multi-media streams, animations, images, webpages, and the like. Some examples of services include, but are not limited to, an online computing service (e.g., "cloud" computing), an authentication service, web-based applications, a file storage and collaboration service, a search service, messaging services such as email and/or instant messaging, and a social networking service.

By way of example, the computing device 102 may be navigated to access and download encrypted content 138 from the service provider 134. The encrypted content 138 may include video content, music, or other content that is protected using some form of digital rights management (DRM). Generally, encrypted content 138 is encoded by an encoder on the service provider side (e.g., prior to distribution to clients) using a suitable compression standard and/or encryption format. Decoding may then occur via a decoder on the consuming side that is configured to recognize, support, and handle decoding of content that is encoded in one or more different compressions standards and/or encryption formats.

A variety of suitable compression standards and/or encryption formats for digital rights management of content may be supported by encoders and decoders including but not limited to MPEG-1, MPEG-2, MPEG-4, VP8, SMPTE VC-1, H.264/AVC, H.264/MVC, H.264/SVC, H.2645/HEVC, HEVC/H.265, and the like. Thus, in accordance with techniques described above and below, the decoder module 126 may be configured to decode encrypted content 138 that is encoded using a plurality of compression standards, including one or more of the example standards enumerated herein.

Having described an example operating environment, consider now example details and techniques associated with one or more implementations of a lossy data stream parser.

Lossy Data Stream Decoder Details

Figure 2:
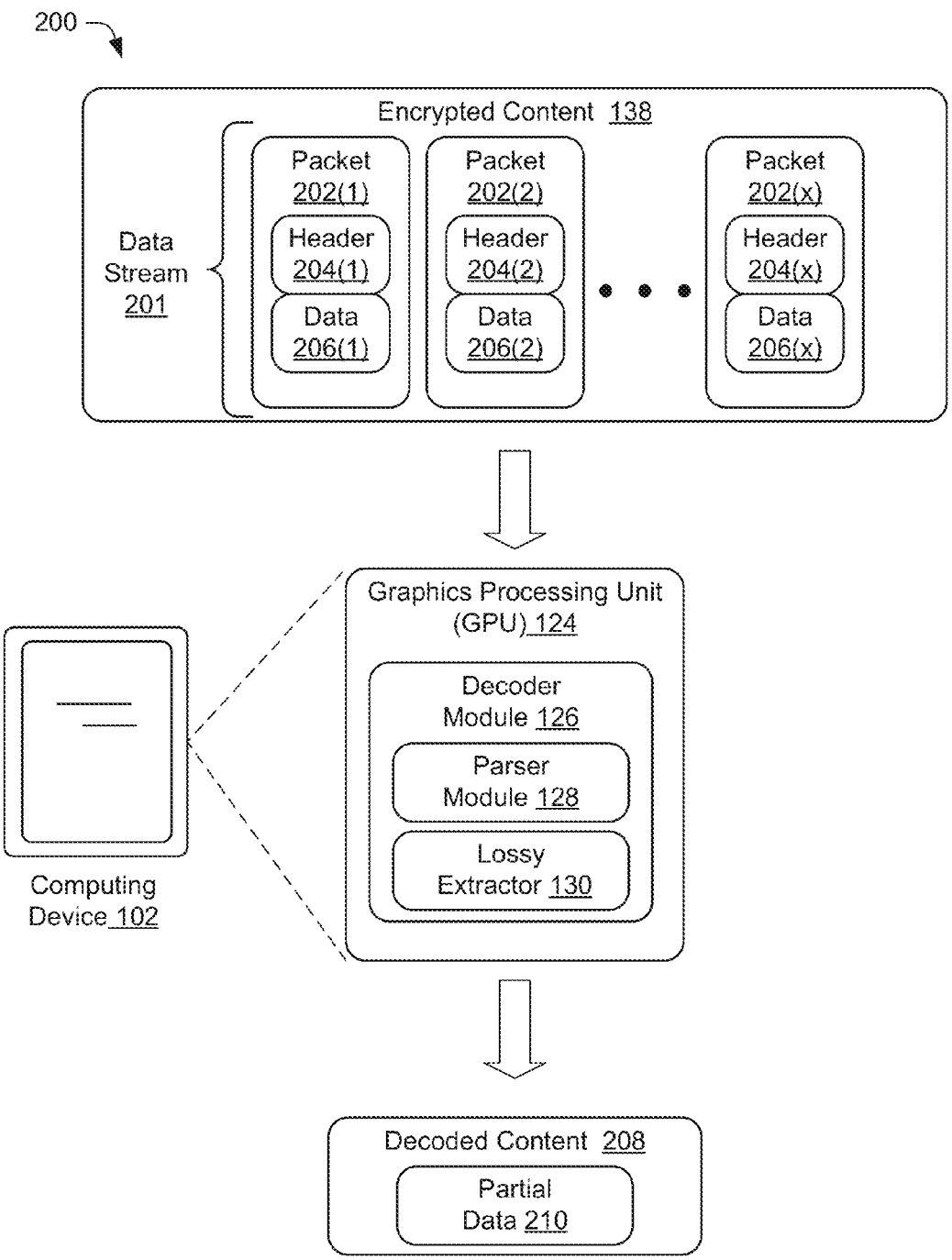
FIG. 2 is diagram depicting example details of a decoder that may be provided with a computing device in accordance with one or more implementations.

FIG. 2 depicts generally at 200 example details of a decoder module 126 that may be provided with a computing device 102 in accordance with one or more implementations. In this example, the decoder module 126 is illustrated as being implemented as a component of a GPU 124. For example, the decoder module 126 may be provided as a dedicated and secure hardware decoder integrated with the GPU 124. Other implementations are also contemplated as previously mentioned, such as a standalone hardware decoder or implementations in software, firmware, or fixed logic device, as well as combinations of software, firmware, fixed logic device, and hardware.

In this example, a data stream 201 of encrypted content 138 is represented as being received by the computing device 102 and processed using the graphics processing unit 124. The data stream 201 may include a plurality of individual packets 202(1), 202(2), . . . , 202(x), each of which contains respective headers 204(1), 204(2), . . . , 204(x) and data 206(1), 206(2), . . . , 206(x). The headers are configured to convey information regarding the packets, such as the packet type, sequencing data, set-up parameters, format information, indications of compression standards used for encoding, indications regarding the amount and type of data contained in the packets, and other metadata, fields, and parameters that may be related to operational settings for the decoder and/or a consuming application. The data portions of the packets represent content payloads, such as frames or "slices" of video data associated with a video data stream or audio snippet data associated with an audio stream.

In operation, the decoder module 126 may be configured to handle tasks related to processing of the data stream 201. This may include obtaining and responding to requests from consuming applications to access and utilize portions of the content. For example, consuming applications may request access to header information and/or particular kinds of packets to facilitate set-up a processing pipeline for encrypted content 138 as well as to control timing, sequencing, and synchronization of rendered content. The consuming application may utilize various set-up information to direct operation of the GPU and/or decoder to decode the content. For security though, the decoder handles the decoding tasks on behalf of the OS and consuming applications so that content is not unduly exposed in the clear and the risk of piracy is mitigated.

To do so, the decoder module 126 may invoke a parser module 128 to perform operations for validation of the data stream, packets, headers and corresponding data and matching of partial data from the data stream to requests in accordance with the validation. Here, information regarding the structure and content of the data stream gleaned from the validation may be used to determine if a request is legitimate, and if so, identify the kind of data that is pertinent to the request.

Pertinent data may be portions of one or more packets or headers that are sufficient to perform operations corresponding to the request. Other data may be considered non-pertinent. For example, sequencing fields in headers may be sufficient for an application to set-up a sequence of frames, and thus may be recognized as being pertinent to a sequencing request. The application though may not need the underlying content of the frames and therefore, the actual frame data may be considered non-pertinent to a sequencing request. A variety of other examples are also contemplated.

The decoder module 126 may then invoke a lossy extractor 130 as noted previously to perform lossy extraction on the data stream. The lossy extractor operates to extract portions of the data stream that are deemed pertinent based on the validation. The extracted portions may then be decoded and/or compressed to form decoded content 208 that may be provided back to the consuming application in response to the request. As represented in FIG. 2, the decoded content 208 is configured to include partial data 210 for one or more of the packets, headers, and corresponding data of the data stream 201. Additional details regarding some example techniques for validation and lossy extraction are discussed under corresponding headings just below.

Validation

Validation may be performed upon a data stream as part of the decoding process. Generally speaking, validation involves parsing the data stream and verifying the header data, metadata, decoded syntaxes and other contents of the data stream against supported standards, specifications, restrictions, and syntaxes to ensure that the data is valid. In other words, checks are performed to make sure the data conforms to compression standards and formats that the decoder is configured to recognize and handle. In addition, the validation enables to the decoder to check for consistency and gather information regarding the data stream, such as the type of packets, type of data contained in the packets, metadata and other information specified by headers, decoded syntaxes and so forth. Based on the information that is gathered through parsing of the data stream, the decoder may be further able to make assessments regarding portions of the packets, headers, and data that are pertinent to particular requests and kinds of requests. By so doing, the decoder is able to identify portions of the data for inclusion in response to requests and form corresponding responses having the partial data. In addition or alternatively, the decoder may recognize portions of the data that can be safely removed and designate these portions for exclusion from the decoded stream.

In one particular example, the decoder may support an H.264/AVC compression standard. In this standard, content may be arranged into units referred to as network abstract layer units (NALUs) (e.g., the packets). At least some NALUs correspond to slice packets containing portions of the content, such that each slice packet contains a "slice" of data (e.g., the pixel data for an image). Each slice may be further divided into one or more groups of pixels known as macroblocks, which carry pixel color, bit masks, and layout data. The headers in this example may be referred to as slice headers. The data stream may also include different kinds of packets such as picture parameter set (PPS) packets, sequence parameter set (SPS) packets, slice packets, and so forth. Thus, validation may involve parsing of slice headers of slice packets to determine conformance with the H.264/AVC compression standard. Headers associated with picture parameter set (PPS) packets and sequence parameter set (SPS) packets may also be validated against the H.264/AVC compression standard. Additionally, cross validations may occur to verify that the data contained within slice headers of slice packets are consistent with data contained within previously validated picture parameter set (PPS) packets and sequence parameter set (SPS) packets. Further, the validation may also occur to ensure that data contained within PPS packets are consistent with the data contained within previously validated SPS packets. Naturally, comparable validation techniques may also be applied to standards other than H.264/AVC, including but not limited to example standards enumerated herein.

In particular, a decoder 126 may include a parser module 128 or comparable functionality that is configured to implement a wide range of validation checks including both self-verifications and cross-verifications. The self-verifications refer to checks that are made within the context of a particular sample, such as for a given request and corresponding slice or slices. Self-verifications may occur for consistency across the same or similar types of packets, such as by comparing slice headers one to another. For example, header syntax for headers corresponding to a request may be validated against one or more of valid parameter ranges associated with a compression standard used for the content, parameter ranges supported by the decoder/system, and consistency of syntax in different portions within a header or between multiple headers.

The cross-verifications refer to checks that are made between different samples and/or in relation to different types of packets/headers. For instance, syntax checks may be made for consistency, restrictions, support ranges, and formatting between picture parameter set (PPS) packets, sequence parameter set (SPS) packets, and slice packets. Other inter-sample and inter-packet validation checks between different kinds of samples and packets are also contemplated. Cross-verifications may also be made with reference to a historical record of expected formats, valid requests, and known good syntax. Thus, the cross-verifications may validate the headers and/or associated data corresponding to a request against expected formats derived based on previous requests.

Lossy Extraction

Lossy extraction may be applied based on the validation to form output data for a response that does not expose full data in the clear. In the example of processing slice headers, for example, the full slice header bits are not exposed to downstream components. Rather, a sub-set of bits is extracted to generate partial slice header data. In particular, portions of the data that are deemed pertinent to the request from a consuming application may be extracted. The lossy extraction be informed by the knowledge regarding the data stream gathered during validation so that the extractor is apply to identify and retrieve pertinent portions. The partial data is selected so that the data is sufficient for consuming applications to perform operations such as pipeline processing set-up and resource management. However, as mentioned, the partial data that is provided is insufficient to enable reconstruction of the full slice header or procurement of the complete data stream in the clear, which acts as a security measure and deterrent to piracy.

In particular, a decoder 126 may be configured to implemented a lossy extractor 130 configured to perform the lossy extraction. The lossy extractor 130 may apply one or more extraction algorithms to form a stream of decoded data that contains less than the full data for streams, packets, and/or headers upon which the extractor operates. Various extraction techniques may be employed to preserve data sufficient to perform operations (e.g., pertinent data) while withholding at least some other portions of the data (e.g., non-pertinent data). In one approach, portions identified as pertinent through validation are extracted. Then a random, pseudorandom, or non-random extraction function may be applied to achieve a designated level of loss. This may involve keeping some of the non-pertinent data, but discarding at least some of the non-pertinent data to make the extraction lossy. For example, the lossy extractor 130 may be configured to produce decoded data having in the range of about fifty percent or greater loss. By way of example, a six bit slice header may be decoded using lossy extraction to create a decoded output header for use by a consuming application that has just two or three bits. This partial slice header is sufficient for performance of the operations the consuming application intends to perform using the decoded header data, but does not enable reconstruction of the full slice header.

Example Procedures

To further illustrate consider the following discussion of example flow diagrams that depict procedures for lossy data stream decoding that can be implemented in accordance with one or more implementations. The example procedure (s) depicted can be implemented in connection with any suitable hardware, software, firmware, or combination thereof. In at least some embodiments, the methods can be implemented by way of a suitably configured computing device, such as the example computing device 102 of FIG. 1 that includes or otherwise makes use of a GPU 124 and/or decoder module 126.

The procedures described in this document may be implemented utilizing the previously described environment, system, devices, and components and in connection with any suitable hardware, software, firmware, or combination thereof. The procedures may be represented as a set of blocks that specify operations performed by one or more entities and are not necessarily limited to the orders shown for performing the operations by the respective blocks.

In general, functionality, features, and concepts described in relation to the examples above may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, and procedures herein may be used in any suitable combinations and are not limited to the particular combinations represented by the enumerated examples in this description.

Figure 3:
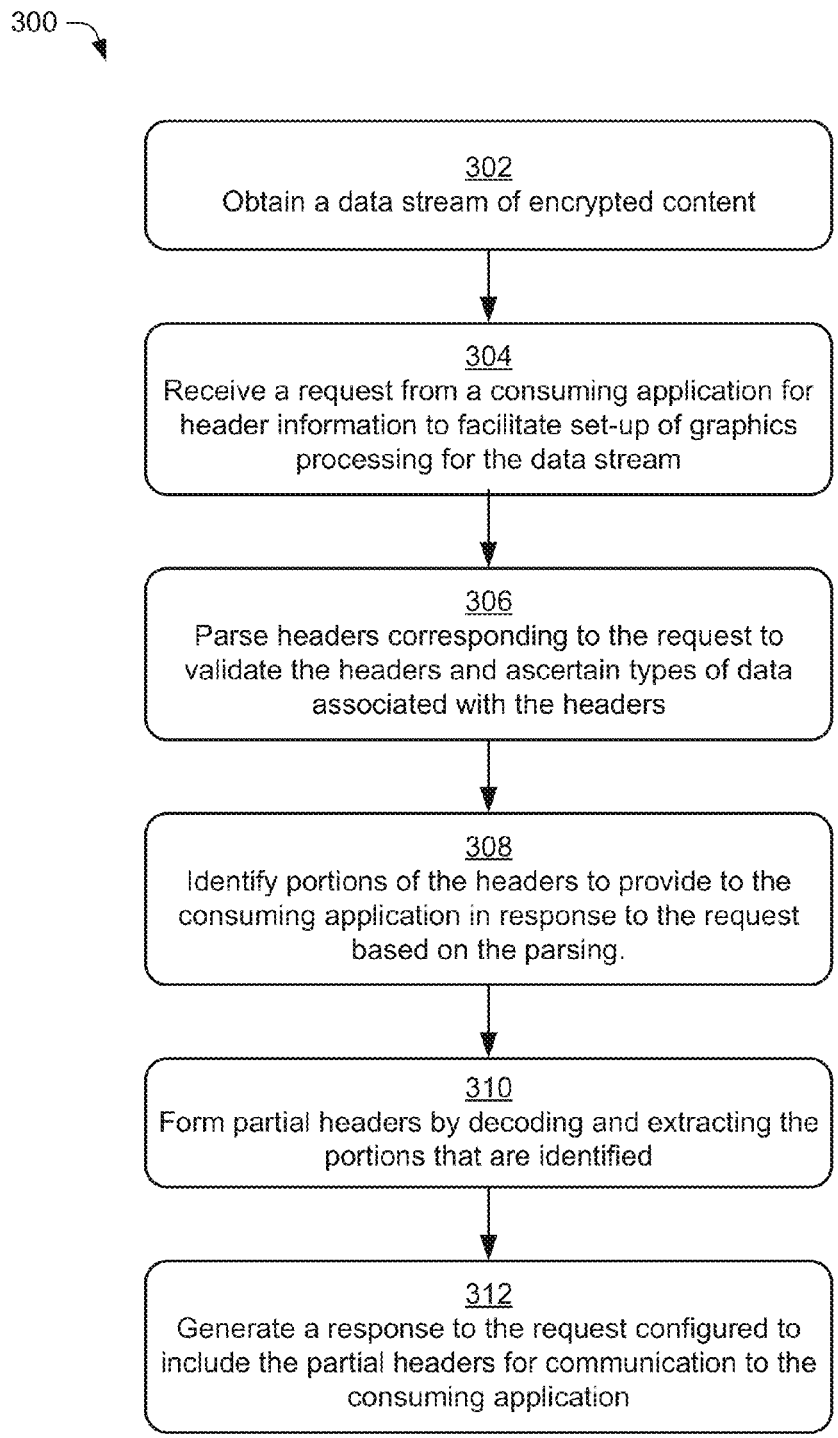
FIG. 3 is a flow diagram that describes details of an example procedure for processing a data stream in accordance with one or more implementations.

FIG. 3 is a flow diagram that describes details of an example procedure 300 for processing a data stream in accordance with one or more implementations. A data stream of encrypted content is obtained (block 302). For example, content may be accessed via a computing device 102 from an online provider, such as the example service provider 134 of FIG. 1. Content may also be obtained via a digital media player, portable media (e.g., DVDs), local streaming, and the like. However obtained, a graphics processing system of the computing device may be configured to handle decoding and rendering of the content. This may occur by way of various components of the computing device, such as the GPU 124, decoder, 126, parser module 128, and/or lossy extractor 130 described herein.

A request is received from a consuming application for header information to facilitate set-up of graphics processing for the data stream (block 304). For example, the operating system 108 or other application may interact with the graphics processing system and in particular the decoder 126 to coordinate tasks related to output of the encrypted content. This may include such operations as processing pipeline set-up, coordinating rendering timelines, device resource management, and so forth. The request may seek portions of information from the data stream, such as metadata that is contained in slice headers or headers of other packets. Accordingly, the decoder 126 may perform processing of headers in response to the request to identify and extract portions of the content that the consuming application may require to perform particular tasks. However, to avoid exposing the data stream of encrypted data to interception and piracy, lossy data stream decoding techniques as described herein are employed.

In particular, headers corresponding to the request are parsed to validate the headers and ascertain types of data associated with the headers (block 306) and portions of the headers to provide to the consuming application in response to the request are identified based on the parsing (block 308). Various validation operations including example self-verifications and cross verifications enumerated in this document may be employed to ensure conformance of the headers with a selected standard and to obtain knowledge regarding the types of packets, headers, decoded syntaxes, and associated data contained in the data stream. In order to perform the validation, a decoder module 126 may invoke a parser module 128 as discussed herein or equivalent functionality. By understanding the contents of the packets through validation, the decoder is able to match requests to the particular portions of information in headers and/or associated portions of the data payloads that are sufficient to perform the various tasks as indicated by the requests. As such, the decoder may provide lossy data rather than having to return chunks of decoded data in the clear that could potentially be used to reconstruct the data stream using a sequence of targeted requests.

Accordingly, partial headers are formed by decoding and extracting the portions that are identified (block 310) and a response to the request is generated that is configured to include the partial headers for communication to the consuming application (block 312). The partial headers are provided to prevent the consuming application from recovering the encrypted content in decoded form. In order to perform lossy extraction, the decoder module 126 may invoke a lossy extractor 130 as discussed herein or equivalent functionality. The lossy extractor 130 may recognize and retain portions of the headers that are deemed pertinent in the manner previously discussed. In addition, the lossy extractor 130 may recognize and discard some portions that are deemed non-pertinent and therefore are safe to remove. This may include purposeful removal of selected types of syntaxes, fields, packets or sequences that are recognized as not being necessary for the accomplishment of certain tasks. Validation may aide in the recognition of both pertinent and non-pertinent data with respect to different requests and types of requests from consuming applications.

Having identified and extracted portions of the headers, the decoder may operate to generate a response to the request that includes the partial data, such as one or more partial headers. The response is then communicated to the requesting application, which may access the decoded data in the response to perform corresponding tasks. Since the application receives partial headers, it is unlikely that a usable full version of the data stream could be reconstructed from the decoded data that is exposed.

Figure 4:
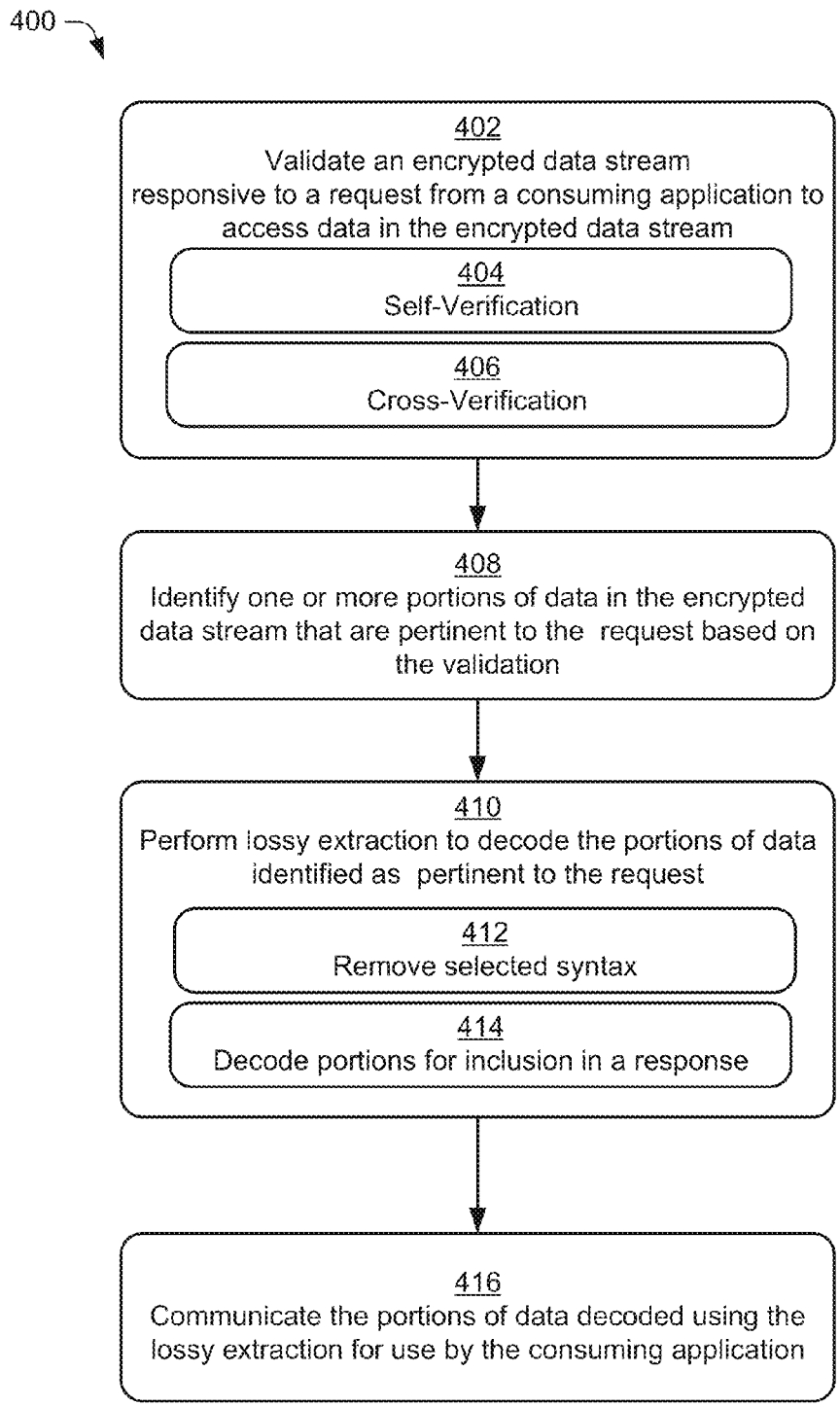
FIG. 4 is a flow diagram that describes details of an example procedure for applying lossy extraction to a data stream in accordance with one or more implementations.

FIG. 4 is a flow diagram that describes details of an example procedure 400 for applying lossy extraction to a data stream in accordance with one or more implementations. An encrypted data stream is validated responsive to a request from a consuming application to access data in the encrypted data stream (block 402). This may include various self-verification (block 404) and cross-verification (block 406) examples of which were previously discussed. Then, one or more portions of data in the encrypted data stream that are pertinent to the request are identified based on the validation (block 408). Here, a request may be matched to known types of requests to determine what kind of data is pertinent or non-pertinent to the request. This matching may depend upon validation of portions of the content that are requested to make sure those portions have expected syntax/formats. In addition, one or more types of data sufficient to service the request may be recognized as pertinent, to the request.

Thereafter, lossy extraction is performed to decode the portions of data identified as pertinent to the request (block 410). As part of the extraction, selected syntax may be removed (block 412). The removed syntax may correspond to portions that are considered non-pertinent portions and accordingly recognized as safe to remove. In addition or alternatively, various portions may be removed randomly to achieve a designated level of loss using a suitable extraction algorithm as noted previously. Of course, one or more portions that are deemed pertinent may also be recognized and these portions may be retained in the decoded output stream. For example, data that matches one or more types of data identified as sufficient to service the request may be extracted, while other data or types of data that are not pertinent may be withheld.

The portions of the data that are identified as pertinent are decoded for inclusion in a response to the request (block 414). In this way, the lossy extraction is applied to produce a decoded output stream having partial data. The portions of data decoded using the lossy extraction are communicated for use by the consuming application (block 416).

Having considered example procedures for a lossy data stream decoder, consider a discussion of an example system in accordance with one or more implementations.

Example System

Figure 5:
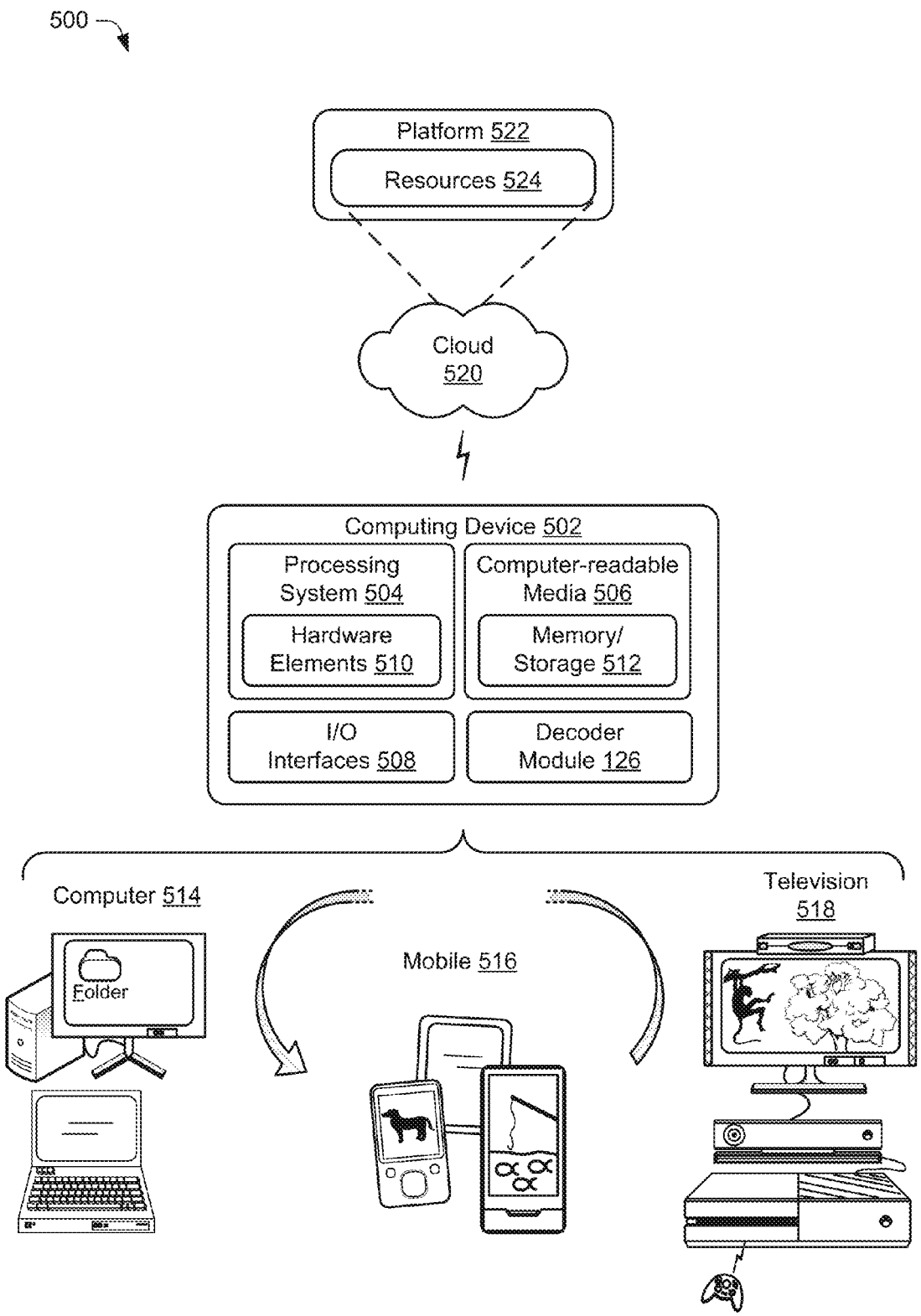
FIG. 5 is a block diagram of a system that can be employed for lossy data stream decoding in accordance with one or more implementations.

FIG. 5 illustrates an example system 500 that includes an example computing device 502 that is representative of one or more computing systems and/or devices that may implement the various techniques described herein. The computing device 502 may be, for example, a server of a service provider, a device associated with a client (e.g., a client device), an on-chip system, and/or any other suitable computing device or computing system.

The example computing device 502 as illustrated includes a processing system 504, one or more computer-readable media 506, and one or more I/O interfaces 508 that are communicatively coupled, one to another. Although not shown, the computing device 502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 504 is representative of functionality to perform one or more operations using hardware. Accordingly, the processing system 504 is illustrated as including hardware elements 510 that may be configured as processors, functional blocks, and so forth. This may include implementation in hardware as an application specific integrated circuit or other logic device formed using one or more semiconductors. The hardware elements 510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 506 is illustrated as including memory/storage 512. The memory/storage 512 represents memory/storage capacity associated with one or more computer-readable media. The memory/storage 512 may include volatile media (such as random access memory (RAM)) and/or nonvolatile media (such as read only memory (ROM), Flash memory, optical disks, magnetic disks, and so forth). The memory/storage 512 may include fixed media (e.g., RAM, ROM, a fixed hard drive, and so on) as well as removable media (e.g., Flash memory, a removable hard drive, an optical disc, and so forth). The computer-readable media 506 may be configured in a variety of other ways as further described below.

Input/output interface(s) 508 are representative of functionality to allow a user to enter commands and information to computing device 502, and also allow information to be presented to the user and/or other components or devices using various input/output devices. Examples of input devices include a keyboard, a cursor control device (e.g., a mouse), a microphone for voice operations, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 502 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 502. By way of example, and not limitation, computer-readable media may include "computer-readable storage media" and "communication media."

"Computer-readable storage media" refers to media and/or devices that enable storage of information in contrast to mere signal transmission, carrier waves, or signals per se. Thus, computer-readable storage media does not include signal bearing media, transitory signals, or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" may refer to signal-bearing media that is configured to transmit instructions to the hardware of the computing device 502, such as via a network. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 510 and computer-readable media 506 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules including the operating system 108, applications 110, decoder module 126, parser module 128, lossy extractor 130 and other program modules may be implemented as one or more instructions and/or logic embodied on some form of computer-readable storage media and/or by one or more hardware elements 510. The computing device 502 may be configured to implement particular instructions and/or functions corresponding to the software and/or hardware modules. Accordingly, implementation of modules as a module that is executable by the computing device 502 as software may be achieved at least partially in hardware, e.g., through use of computer-readable storage media and/or hardware elements 510 of the processing system. The instructions and/or functions may be executable/operable by one or more articles of manufacture (for example, one or more computing devices 502 and/or processing systems 504) to implement techniques, modules, and examples described herein.

As further illustrated in FIG. 5, the example system 500 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 500, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 502 may assume a variety of different configurations, such as for computer 514, mobile 516, and television 518 uses. Each of these configurations includes devices that may have generally different constructs and capabilities, and thus the computing device 502 may be configured according to one or more of the different device classes. For instance, the computing device 502 may be implemented as the computer 514 class of a device that includes a personal computer, desktop computer, a multi-screen computer, laptop computer, netbook, and so on.

The computing device 502 may also be implemented as the mobile 516 class of device that includes mobile devices, such as a mobile phone, portable music player, portable gaming device, a tablet computer, a multi-screen computer, and so on. The computing device 502 may also be implemented as the television 518 class of device that includes devices having or connected to generally larger screens in casual viewing environments. These devices include televisions, set-top boxes, gaming consoles, and so on.

The techniques described herein may be supported by these various configurations of the computing device 502 and are not limited to the specific examples of the techniques described herein. This is illustrated through inclusion of the decoder module 126 on the computing device 502. The functionality represented by the decoder module 126 and other modules/applications may also be implemented all or in part through use of a distributed system, such as over a "cloud" 520 via a platform 522 as described below.

The cloud 520 includes and/or is representative of a platform 522 for resources 524. The platform 522 abstracts underlying functionality of hardware (e.g., servers) and software resources of the cloud 520. The resources 524 may include applications and/or data that can be utilized while computer processing is executed on servers that are remote from the computing device 502. Resources 524 can also include services provided over the Internet and/or through a subscriber network, such as a cellular or Wi-Fi network.

The platform 522 may abstract resources and functions to connect the computing device 502 with other computing devices. The platform 522 may also serve to abstract scaling of resources to provide a corresponding level of scale to encountered demand for the resources 524 that are implemented via the platform 522. Accordingly, in an interconnected device embodiment, implementation of functionality described herein may be distributed throughout the system 500. For example, the functionality may be implemented in part on the computing device 502 as well as via the platform 522 that abstracts the functionality of the cloud 520.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
obtaining a data stream of encrypted content at a computing device;
receiving a request from a consuming application for header information to facilitate set-up of graphics processing for the data stream;
parsing headers corresponding to the request to validate the headers and ascertain types of data associated with the headers;
identifying portions of the headers as pertinent to the request and portions of the headers as non-pertinent to the request to provide to the consuming application in response to the request based on the parsing;
forming partial headers by decoding and extracting both the portions of the headers identified as pertinent and one or more of the portions of the headers identified as non-pertinent effective to make the extraction lossy, the partial headers being a sub-set of the headers and sufficient for the consuming application to set-up the graphics processing for the data stream while not enabling reconstruction of the headers; and generating a response to the request configured to include the partial headers for communication to the consuming application.

2. The computer-implemented method of claim 1, wherein parsing the headers comprises determining whether the headers conform to a compression standard employed for compression of the encrypted content.

3. The computer-implemented method of claim 1, wherein the encrypted content comprises protected video content.

4. The computer-implemented method of claim 1, wherein the method is performed by a hardware decoder of the computing device.

5. The computer-implemented method of claim 4, wherein the hardware decoder is configured as a component of a graphics processing unit (GPU) of the computing device.

6. The computer-implemented method of claim 1, wherein parsing the headers comprises performing self-validation to check the headers corresponding to the request against one or more of valid parameter ranges associated with a compression standard used for the encrypted content, parameter ranges supported by the system, or consistency across the headers.

7. The computer-implemented method of claim 1, wherein parsing the headers comprises performing cross-validation to validate the headers corresponding to the request against expected formats derived based on previous requests.

8. The computer-implemented method of claim 1, wherein the headers comprise slice headers associated with slices of content in accordance with a compression format employed by an encoder used to generate the encrypted content.

9. The computer-implemented method of claim 1, wherein the partial headers are provided to prevent the consuming application from recovering the encrypted content in decoded form.

10. The computer-implemented method of claim 1, wherein the consuming application comprises an operating system for a computing device executed via a processing system of the computing device.

11. One or more computer-readable storage media storing instructions that when executed by a computing device cause the computing device to implement a decoder module operable to perform operations comprising:
validating an encrypted data stream responsive to a request from a consuming application to access data in the encrypted data stream;
identifying one or more portions of the data in the encrypted data stream that are pertinent to the request and one or more portions of the data in the encrypted data stream that are non-pertinent to the request based on the validation;
performing lossy extraction to decode both the one or more portions of the data identified as pertinent to the request and a sub-portion of the one or more portions of the data identified as non-pertinent to the request, the portions of the data being a sub-set of the data and sufficient to fulfill the request while not enabling reconstruction of the data; and
communicating the portions of data decoded using the lossy extraction for use by the consuming application.

12. One or more computer-readable storage media of claim 11, wherein validating comprises:
performing self-validation to check decoded syntaxes for the encrypted data stream corresponding to the request against one or more of valid parameter ranges associated with a compression standard used for the encrypted data stream, parameter ranges supported by the decoder module, or consistency across packets; and
performing cross-validation to validate the decode syntaxes for the encrypted data stream corresponding to the request against expected formats derived based on previous requests.

13. One or more computer-readable storage media of claim 11, wherein performing the lossy extraction comprises selectively removing syntaxes that are not pertinent to the request and decoding the portions of the data identified as pertinent to the request to form partial decoded data.

14. One or more computer-readable storage media of claim 11, wherein performing the lossy extraction comprises recognizing one or more types of data sufficient to service the request, extracting the data that matches the one or more types, and withholding at least some of the data identified as non-pertinent to the request.

15. One or more computer-readable storage media of claim 11, wherein the decoder module comprises a hardware decoder integrated with a processing system of the computing device.

16. A system comprising:
a processing system;
a decoder module operable via the processing system and including a parser module and a lossy extractor, the decoder module configured to:
receive a request from a consuming application for slice header information to facilitate set-up of graphics processing and resource management for a data stream of encrypted content;
invoke the parser module to:
parse slice headers corresponding to the request to validate the slice headers and ascertain types of data associated with the slice headers; and
identify portions of the slice headers as pertinent to the request and portions of the headers as non-pertinent to the request to provide to the consuming application in response to the request based on matching of the portions of the slice headers identified as pertinent to types of data that are pertinent to set-up of graphics processing for the data stream;
invoke the lossy extractor to form partial headers by extracting and decoding both the portions of the slice headers identified as pertinent to the request and one or more of the portions of the slice headers identified as non-pertinent effective to make the extraction lossy, the partial headers being a sub-set of the slice headers and sufficient for the consuming application to set-up the graphics processing for the data stream while not enabling reconstruction of the slice headers; and
generate a response to the request configured to include the partial headers for communication to the consuming application.

17. The system of claim 16, wherein the processing system comprises a central processing unit (CPU) and a graphics processing unit (GPU) that is separate from the central processing unit.

18. The system of claim 17, wherein the decoder module is implemented as a component of the graphics processing unit (GPU).

19. The system of claim 16, wherein the parser module to parse the slice headers is further configured to:
perform self-validation to check the slice headers corresponding to the request against one or more of valid parameter ranges associated with a compression standard used for the encrypted data stream, parameter ranges supported by the computing device, or consistency across the slice headers; and perform cross-validation to validate the slice headers corresponding to the request against expected formats derived based on previous requests.

20. The system of claim 16, wherein the decoder module is configured to decode encrypted content that is encoded using a plurality of compression standards including at least H.264/AVC and HEVC/H.265 standards.

* * * * *